United States Patent
Cutler et al.

(10) Patent No.: US 6,881,703 B2
(45) Date of Patent: Apr. 19, 2005

(54) THERMALLY CONDUCTIVE HONEYCOMBS FOR CHEMICAL REACTORS

(75) Inventors: Willard A. Cutler, Big Flats, NY (US); Lin He, Horseheads, NY (US); Anthony R. Olszewski, Bath, NY (US); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 225 days.

(21) Appl. No.: 09/924,676

(22) Filed: Aug. 8, 2001

(65) Prior Publication Data

US 2003/0100448 A1 May 29, 2003

(51) Int. Cl.[7] .......................... B01J 21/04; B01J 21/18; B01J 23/02
(52) U.S. Cl. ............. 502/439; 502/527.18; 502/527.19; 502/527.23; 502/527.24
(58) Field of Search ........................... 502/439, 527.11, 502/527.19, 527.23, 527.24, 527.18

(56) References Cited

U.S. PATENT DOCUMENTS

| | | | |
|---|---|---|---|
| 4,041,591 A | 8/1977 | Noll et al. ............. | 29/157.3 R |
| 4,041,592 A | 8/1977 | Kelm ..................... | 29/157.3 R |
| 4,329,162 A | 5/1982 | Pitcher, Jr. ............. | 55/523 |
| 4,758,272 A | 7/1988 | Pierotti et al. .......... | 75/246 |
| 4,888,320 A | 12/1989 | Ihara et al. ............. | 582/304 |
| 5,105,539 A | 4/1992 | Maus et al. ............. | 29/890 |
| 5,208,206 A | 5/1993 | Yasaki et al. ............ | 502/334 |
| 5,492,883 A * | 2/1996 | Wu ........................ | 502/439 |
| 5,525,291 A * | 6/1996 | St. Julien ................ | 419/41 |
| 5,925,308 A * | 7/1999 | Fewkes et al. ............ | 264/623 |
| 6,413,898 B1 * | 7/2002 | Faber et al. .............. | 502/64 |

FOREIGN PATENT DOCUMENTS

| | | | | |
|---|---|---|---|---|
| EP | 0197644 A1 * | 10/1986 | ............ | B01J/37/00 |
| EP | 0450897 A2 * | 10/1991 | ............ | B22F/3/10 |
| EP | 0524438 A2 * | 1/1993 | ............ | B22F/3/10 |
| EP | 0739868 A1 * | 10/1996 | ......... | C04B/35/634 |
| EP | 0838317 A1 * | 4/1998 | ............ | B28B/1/00 |
| EP | 1 110 605 | 6/2001 | | |
| WO | 00/66486 | 11/2000 | | |
| WO | 00/66487 | 11/2000 | | |
| WO | WO 01/16049 A1 * | 3/2001 | ........... | C04B/33/32 |

* cited by examiner

Primary Examiner—Stanley S. Silverman
Assistant Examiner—Jonas N. Strickland
(74) Attorney, Agent, or Firm—Kees van der Sterre

(57) ABSTRACT

Monolithic metallic catalyst substrates offering improved heat conductivity are provided from metal powder extrusion batches of copper, tin, zinc, aluminum, iron, silver, nickel, and mixtures and alloys thereof by extrusion through a honeycomb extrusion die followed by drying and firing in a two stage firing process to oxidize organic extrusion batch components, remove residual oxides from the porous wall structure, and consolidate the metal powders to strong, integral honeycomb support structures.

9 Claims, No Drawings

THERMALLY CONDUCTIVE HONEYCOMBS FOR CHEMICAL REACTORS

BACKGROUND OF THE INVENTION

The present invention relates to structured catalysts and more particularly to honeycomb structures useful as catalysts or catalyst supports for chemical reactors wherein heat management is of primary importance.

In a chemical reactor, regardless of its configuration or size, the two principal variables affecting the reaction rate are time and temperature. By controlling the heat transfer, and thus the temperature, the length of time a reaction or process required for completion can be determined. For this reason, temperature control is a critical reactor design consideration for chemical processes. Example processes wherein managing reactor heat is especially important include selective oxidations to make products such as ethylene oxide, phthalic anhydride, maleic anhydride, formaldehyde, acrylonitrile, acrolein, acrylic acid, methacrolein, methacrylic acid, methacrylonitrile, 1,2-dichloroethane, vinyl chloride, methanol synthesis, and Fischer-Tropsh synthesis.

In selective oxidation processes, it is important to manage the exothermic heat of reaction to maintain desired product selectivity. Non-selective by-products of oxidation (e.g. CO, $CO_2$, $H_2O$) are more thermodynamically favored than the partially oxidized intermediates, so reactor operation is a delicate balance between maximizing the production rate of desired product while avoiding over-oxidation. Temperature is the most important operating variable which affects the reaction rate, and if it is not controlled closely, selective oxidation reactions can easily run out of control, resulting in a large heat release, loss of selectivity, and possible safety and environmental hazards.

The importance of heat transfer in laboratory scale reactors for developing processes such as above described can go unnoticed because laboratory equipment generally comprises relatively small vessels having a large surface-to-volume ratio. The surface area available for heat transfer makes it simple to maintain the reaction at isothermal conditions. On an industrial scale, on the other hand, surface-to-volume ratios are much smaller and make heat transfer and temperature control much more difficult.

The use of monolithic honeycomb catalysts or catalyst supports in certain types of chemical reactors is well known. For some gas phase processes, such as the oxidation of unburned species present in the engine exhaust streams of automobiles, high reactor temperatures are permissible and honeycombs of refractory ceramic materials such as cordierite or mullite are typically employed. Heat management during the normal operation of these systems is not a major problem.

For endothermic and exothermic processes that are of interest to the petroleum refining, petrochemical and chemical industries, however, structured supports or catalysts of honeycomb configuration have not been widely used. Among other issues, the control of reactor temperature in beds of such structured catalysts or supports can be difficult.

A specific example of a field in which reactor temperature control is particularly important is in systems for the reforming of hydrocarbon feed streams to generate hydrogen-rich gases for the operation of hydrogen fuel cells. Fuel cells have become a topic of interest for applications such as motor vehicle propulsion because of their relatively high energy efficiency and low levels of pollutant emission. Most of the mobile and stationary fuel cell applications presently being considered will require fuel reforming, but while the reforming of several types of fuels has been shown to be feasible, there is an interest in reducing the size of such reforming systems, especially for transportation applications.

The reactions involved in fuel reforming are several, and may include sulfur removal from the hydrocarbon feed, partial oxidation of the feed to produce a hydrogen-rich reformate, hydrogen enrichment of the reformate through water-gas shift processing, and preferential oxidation to reduce the carbon monoxide content of the hydrogen-rich product stream. All of these reactions require good heat management, with the water-gas shift yields being particularly sensitive to temperature.

WO 00/66486 and WO 00/66487 provide examples of fuel reformer systems that could be adapted for fuel cell applications such as described. WO 00/66486 proposes a water-gas shift catalyst comprising a platinum group metal supported directly on zirconia for use in such a system, the zirconia consisting of pellets or a zirconia-containing monolith. However, a significant disadvantage of the zirconia catalysts proposed in the '486 publication is the relatively poor heat conductivity of zirconia, which presents difficulties for reactor temperature control and thus for hydrogen yield in the reactor systems described.

The use of steel honeycomb structures in catalytic reactors such as automotive catalytic converters is well known, these typically being formed by the shaping of sheet metal feedstock as disclosed, for example, in U.S. Pat. No. 5,105,539. Similar honeycomb structures of iron alloy, nickel, aluminum or copper are proposed in EP 1110605 for use as heat-conductive catalyst supports that can reduce hot spots in externally cooled tubular reactors for the selective chlorination or oxychlorination of alkenes. Iron-aluminum alloy honeycomb bodies made by the extrusion of metal powder batches through honeycomb extrusion dies, as disclosed in U.S. Pat. No. 4,758,272, are examples of honeycomb structures that could be used in this process.

For various reasons, these and other prior art extruded metal honeycombs have not yet proven satisfactory for use as catalyst substrates in many chemical reactions. Among deficiencies of the known extruded metal honeycombs are limited catalyst compatibility (due in part to excess carbon and other impurity levels), inadequate thermal conductivity for some reactions, a limited porosity range, and/or elastic properties that limit the physical durability of the substrates. On the other hand, metal honeycombs formed of aluminum or copper sheet stock demonstrate inadequate porosity, strength and durability for many catalyst support applications.

SUMMARY OF THE INVENTION

The present invention provides extruded metal honeycombs of improved physical and chemical properties that exhibit good catalyst compatibility, high thermal conductivity for reactions requiring improved heat management, and levels of porosity that can be controlled to achieve a required balance between thermal conductivity and compatibility with catalyst or catalyst support coatings. These honeycombs provide substantial advantages as packing structures for chemical reactors, both in hydrocarbon reformers and in other chemical processing systems, those advantages including a reduced catalyst bed back-pressure, a higher catalyst surface area to volume ratio in the catalyst bed, and a lower thermal mass.

In a first aspect, then, the invention resides in an improved method for moderating the reaction temperature of a catalytically promoted exothermic or endothermic chemical reaction. That method comprises the step of carrying out the reaction in contact with a catalyst disposed on the channel walls of a monolithic metallic catalyst substrate such as hereinafter more fully described.

Particularly suitable for use in water-gas shift reactors and other reactors requiring close temperature control are extruded copper and copper alloy monoliths of substantial purity and controlled porosity. By substantial purity is meant a metal or metal alloy composition substantially free of carbon and other impurities that are normal incidents of the powder extrusion process. Although other metals, including zinc, silver, aluminum, tin, iron, nickel and alloys thereof, could alternatively be used, copper and its alloys offer specific advantages for these reactions, particularly including an enhanced ability to conductively dissipate large heats of reaction even when configured as honeycombs with relatively thin yet porous walls. This advantage, together with the ability of thin-walled copper-based honeycombs to reduce catalyst bed pressure drop at relatively high surface to volume ratios, can substantially improve the process economics of many temperature-sensitive chemical processes.

Underlying the invention and important for securing many of the advantages thereof is an improved method for making a monolithic metallic catalyst substrate of high purity, thermal conductivity and strength. The method is a honeycomb extrusion method wherein a metal powder extrusion batch is first compounded. That batch comprises, first, a powder of a metal selected from the group consisting of copper, tin, zinc, aluminum, silver, iron, nickel, and mixtures and alloys thereof. Also included in the batch will be at least one carbon-containing temporary organic binder effective to impart green strength to the batch that is sufficient to permit extrudates comprising the metal powder and organic binder to be handled after extrusion. If desired to adjust batch viscosity and extrusion characteristics, one or more fugitive additives selected from the group consisting of liquid vehicle constituents and extrusion aides may also be present.

The batch thus provided is next extruded through a honeycomb extrusion die to shape a honeycomb substrate preform, the preform is dried if necessary to expel fugitive vehicle constituents therefrom, and it is then heated to remove the temporary binder and any residual vehicle and extrusion aides that may be present. For this purpose, the preform will be heated in an oxidizing atmosphere for a time and to a temperature at least sufficient to substantially remove the carbon-containing organic binder and any other residues by vaporization or oxidation. The intermediate product thus provided is a substantially carbon-free preform.

Following the oxidation step the carbon-free preform is next heated in a reducing atmosphere to convert any metal oxide species present in the preform to metallic species, and to sinter the preform to a strong, unitary monolithic metallic honeycomb substrate. This heating is carried for a time and to a temperature that will insure substantially complete removal of metal oxides from the preform, with optional additional heating used to adjust the porosity of the channel walls of the substrate as desired for a particular application.

The product of the method as described is a metal honeycomb catalyst substrate free of metal oxides and residual carbon that exhibits high thermal conductivity, good compatibility with catalysts and catalyst support coatings, and controlled levels of porosity for the effective support of such catalysts and catalyst support coatings. The geometric characteristics of these honeycombs such as cell density (cells per unit of honeycomb cross-section) and channel wall thickness can readily be adjusted to meet the requirements of a variety of chemical processing applications.

DETAILED DESCRIPTION

The advantageous properties of extruded metal catalyst substrates provided in accordance with the invention derive importantly from the fact that the substrates are substantially free of non-metallic impurities such as elemental carbon and residual metal oxides from the binder burnout step. By substantially free of such impurities is meant a combined elemental carbon and metal oxide content below 0.01% by weight. In general, the extruded metal honeycombs of the prior art retained significant amounts of metal oxides and/or carbon, both of which can have substantial adverse effects on thermal conductivity and/or catalyst compatibility.

The use of copper and copper alloys to form the honeycomb substrates of the invention is preferred because of the advantageous combination of mechanical and thermal properties exhibited by copper-based materials. Table I below compares the thermal and other physical properties of a variety of metals and metal alloys that may be considered for use in accordance with the invention. Included in Table I for each of the metals or alloys reported are its density D (in g/cc), its average coefficient of thermal expansion CTE ($\times 10^{-7}/°$ C.), its melting point $T_m$ (° C.), its room temperature heat capacity $C_p$ (in cal/g.K), its room temperature thermal mass M* (in cal/cc.K) calculated as the product of its density and room temperature heat capacity, its thermal conductivity TC (in W/(m.K), its elastic modulus E (in Gpa) its tensile strength TS, (in MPa) and its thermal shock parameter TSP calculated as the quotient of its strength to the product of its expansion coefficient and elastic modulus.

TABLE I

| | | | | Metal Properties | | | | | | |
|---|---|---|---|---|---|---|---|---|---|---|
| Name | Composition | D | CTE | $T_m$ | $C_p$ | M* | TC | E | TS | TSP |
| Fe-alloy | Fe/Cr/Al | 7.85 | 147 | 1500 | 0.11 | 0.865 | 36-10 | 190 | 517 | 185 |
| copper | Cu | 8.96 | 177 | 1080 | 0.092 | 0.824 | 398 | 110.3 | 455 | 233 |
| silver | Ag | 10.4 | 197 | 961 | 0.056 | 0.582 | 418.7 | | 290 | |
| zinc | Zn | 7.14 | 397 | 419 | 0.0928 | 0.663 | 113 | | | |
| nickel | Ni | 8.9 | 133 | 1453 | 0.105 | 0.935 | 92 | | 317 | |
| aluminum | Al | 2.7 | 234 | 660 | 0.215 | 0.581 | 237 | 62.1 | 269 | 185 |
| iron | Fe | 7.86 | | 1536 | 0.106 | 0.833 | 80.3 | 197 | | |
| gold | Au | 19.3 | | 1064 | | | 315 | | | |

TABLE I-continued

| | | Metal Properties | | | | | | | | |
|---|---|---|---|---|---|---|---|---|---|---|
| Name | Composition | D | CTE | $T_m$ | $C_p$ | M* | TC | E | TS | TSP |
| chromium | Cr | 7.19 | 62 | 1875 | 0.11 | 0.791 | 67 | 248 | | |
| brass | 70Cu—30Zn | 8.5 | 203 | | | | | 188 | | |
| bronze | 95Cu—2Sn | 8.8 | | | | | | | | |

The advantages of copper and copper alloys in terms of thermal conductivity are evident from the data in Table I. Thus the conductivity of copper is much higher than that of FeCr alloy, aluminum and iron and only slightly less than that of silver. Silver is not a practical material for most applications for reasons of cost, but can be used as an alloying agent in some cases while aluminum has a significantly lower melting point than copper.

Copper and its alloys are also preferred materials because they offer outstanding resistance to corrosion, ease of fabrication, and good strength and fatigue resistance. Copper and certain brasses, bronzes and cupronickels are widely used for applications requiring a combination of good corrosion resistance and heat conductivity. Most copper-based metals are chemically stable against attack by fresh and salt water solutions, alkaline solutions (except those containing ammonia), and most other organic solvents or chemicals including amines, alkanolamines, esters, glycols, ethers, ketones, alcohols, aldehydes, naphtha and gasoline.

The desired form of starting material for the extrusion of metallic honeycomb catalyst substrates is fine metal powder. Metal powder particle sizes should not exceed 250 micrometers; preferably powder with an average particle size not exceeding about 75 micrometers will be used. Powders of most of the useful metals including copper, zinc, tin, silver, gold, aluminum, iron, and nickel as well as brass (Cu/Zn), bronze (Cu/Sn) and other copper alloys are either commercially available or readily produced from coarser materials. It is difficult to form extrudible mixtures if the powders employed are too coarse.

The selected metal powder is next blended with a suitable temporary organic binder and, preferably, an organic extrusion aid such as an organic lubricant. Additions of about 1–30% by weight of temporary binder and 0.01 to 20% by weight of organic lubricant or other extrusion aide, those additions being calculated in excess of the metal powder content of the batch (100%) are suitable. Conventional temporary binders may be used, these including the common water-soluble cellulose binders such as methyl cellulose. The organic lubricants and other extrusion aides to be employed may also be conventional. Examples of such materials include the metal stearates, polyvinyl alcohol, oleic acid, polyethylene glycol, and glycerol, with oleic acid being preferred. Best results are usually obtained if the powder is first blended with the lubricant, and then with the organic binder.

In most cases, and particularly with the preferred binders and lubricants above described, a liquid vehicle is desirably included in the batch to develop a plastic consistency facilitating extrusion. For the water-soluble cellulose binders the preferred liquid vehicle is water. The water content of the batch can readily be adjusted to secure the batch consistency desired for extrusion; in general from 0.1–30% by weight of vehicle constituents, calculated as a percentage in excess of the metal powder content of the batch, will be used.

The extrusion of metal powder batches produced as described may be carried out employing conventional extrusion processes and equipment. The particular honeycomb configuration to be provided can be tailored to the particular catalyst substrate application, as hereinafter more fully described. Where the extrusion batch contains a significant addition of a vehicle to facilitate extrusion, drying of the wet extruded honeycomb such as by heating in air is useful to provide a dry green honeycomb having sufficient rigidity for handling.

Processing of the green extruded metal honeycomb to provide a unitary catalyst substrate is carried in two stages, either as two separate steps or in a continuous firing operation. The first stage is a binder burnout stage involving heating the green honeycombs under oxiding conditions to remove temporary binders and organic extrusion aides therefrom. Heating in air or other oxygen-containing gases at temperatures in the range of 350–700° C. for times in the range of 4–24 hours usually insures substantially complete removal of these organic constituents, and any carbon-containing residues thereof. For larger honeycombs containing relatively large amounts of organic binder components, heating in a low oxygen atmospheres, e.g., N2 with only 2–4% oxygen present, can slow the rate of binder burnout and thereby reduce the incidence of honeycomb cracking.

The second stage of the process involves heating the debindered metal honeycombs under reducing conditions to reduce to metal any metal oxides developed therein during the oxidizing debinding stage. Oxygen should be excluded during this heating step. Sintering of the metal powder to consolidate it to a unitary porous or non-porous structure is also accomplished in this phase.

Hydrogen or a hydrogen-containing forming gas atmosphere of 1% or more H2 content (e.g., a 6% H2—N2 mixture) can provide the necessary reducing conditions for oxide removal and sintering of the part. In the case of copper powders, forming gas treatments of 1–16 hours duration at temperatures in the 600–700° C. range are generally adequate for these purposes. However, in the event residual oxides are a problem, longer holds at the selected peak heating temperatures, e.g., holds of 24 hours or more, can be useful to insure the complete removal of oxides. Powder x-ray diffraction examinations of copper metal honeycombs consolidated under these conditions should indicate only pure copper present in the structure, with no detectible oxides remaining.

Any of a wide variety of geometric forms may be selected for the metal honeycomb catalyst substrates of the invention. The exact form of honeycomb will depend upon the particular application for which the catalyst substrate is intended; configurations for applications such as fuel reforming may differ significantly from those such as required for chemical applications such as aldehyde, ethylene oxide, or acrylic acid production. Both the channel sizes and the channel shapes of the honeycomb channels may be adjusted, with circular, square, triangular, rectangular, hexagonal, sinusoidal, etc. channel cross-sections being possible.

Likewise, the walls of the monoliths may be either dense or porous depending on whether the monolith is to be used for flow-through processing, or instead in a partially plugged configuration facilitating "wall flow" processing. In general, wall porosities corresponding to aggregate pore volumes in the range of 0–50% can be used. Higher wall porosities are not preferred since both the heat conductivity and the wall strength of the honeycombs can be compromised thereby.

Some specific examples of extruded metal honeycomb geometries useful as catalyst substrates are reported in Table II below. Each honeycomb geometry is identified by its cell density (CD)—wall thickness (WT) index, cell density being reported in channels per in$^2$ of honeycomb cross-section transverse to the channel direction and channel wall thickness in thousandths of an inch. Included in Table II for each of the configurations reported are the honeycomb channel shape, geometric surface area (GSA), fraction of open frontal area (OFA), and channel hydraulic diameter $D_h$. Also included in Table II for comparison is the equivalent geometric surface area of a bed of pelletized catalyst substrate material consisting of pellets of ⅛-inch diameter and 1/16-inch thickness.

TABLE II

Honeycomb Substrate Geometries

| Honeycomb Geometry (CD-WT) | Channel Shape | GSA (cm$^2$/cm$^3$) | OFA | $D_h$ (mm) |
|---|---|---|---|---|
| 200-22 | Square cell | 15.3 | 0.475 | 1.24 |
| 400-7 | Square cell | 27.1 | 0.740 | 1.09 |
| 600-4.3 | Square cell | 34.5 | 0.800 | 0.93 |
| 900-2.5 | Square cell | 43.7 | 0.856 | 0.78 |
| 1600-6.5 | Square cell | 46.6 | 0.548 | 0.47 |
| 1800-8 | Square cell | 44.1 | 0.436 | 0.40 |
| 1/8" dia × 1/16" | Pellets | 10.6 | | |

The heat transfer characteristics of these metal honeycombs of course vary substantially depending upon the particular honeycomb geometry that is selected. For highly exothermic reactions wherein maximal heat transfer is required, lower channel hydraulic diameters and lower open frontal areas, corresponding to lower honeycomb void fractions, will be selected to increase conductive and convective heat transfer. In general, OFA values below the 0.75–0.85 range offered by ceramic substrates such as used to support hydrocarbon oxidation catalysts in automotive catalytic converters will be used, with values in the 0.40–0.60 range being preferred. Although these void fractions can extend the transient time need to bring the catalyst support to effective operating temperatures, the enhanced radial thermal conductivity can dramatically reduce hot spot temperatures in the reactor.

For any given void fraction the catalytically active surface area of the metal support can be increased by increasing the cell density and thus the GSA of the support. Cell densities in the range of 200–3000 cpsi or higher can be used.

As compared with conventional packed-bed reactors loaded with catalyst pellets, reactors incorporating honeycomb monolith supports are known to offer greatly reduced pressure drops, up to two orders of magnitude in some cases. However, published studies have shown only modest improvements in heat transfer from the use of metal support structures, both for Sulzer-type structured metallic supports (G. Eigenberger, (1997), *Handbook of heterogeneous Catalysis,* Vol. 3, Wiley-VCH, Weinheim, pp1399–1425) or FeCr alloy honeycomb monoliths (Cybulski and Moulijn, *Chemical Engineering Science,* 49, 19–27, 1994). In the case of prior art honeycomb structures formed from metal powders, an important factor affecting results may have been the presence of oxidic and other impurities in the structures that can reduce the high temperature thermal conductivity thereof.

Honeycombs provided in accordance with the method of the invention can be used in any of a variety of different configurations depending upon the way in which heat is to be supplied to or extracted from the honeycomb structure. For applications involving only moderately endothermic or exothermic reactions, simple flow-through honeycomb configurations are suitable because heat flow through the interconnected wall structure and outer surfaces of the honeycombs can be sufficient to achieve the desired temperature control in the honeycomb interior.

Where more substantial amounts of heat must be removed or supplied, modified honeycomb designs such as wall flow or Z-flow honeycomb designs can be used. In wall flow honeycomb designs, porous channel walls are used and alternate channels in the channel array are plugged at alternate ends of the structure, such that fluid flow is forced through the porous walls and heat exchange between the fluid and the walls is facilitated. U.S. Pat. No. 4,329,162, expressly incorporated herein by reference, provides examples of wall flow honeycomb designs.

Z-flow honeycombs can also be used, these comprising at least two separate but adjacently interspersed channel arrays incorporating non-porous channel walls. A first channel array, comprising e.g., alternating rows of channels, is separately manifolded or vented to provide a separate flow path for a heat transfer fluid passing through the honeycomb structure, that fluid acting to moderate reaction temperatures developed in the adjacent remaining channels or rows of channels. U.S. Pat. Nos. 4,041,591 and 4,041,592, expressly incorporated herein by reference, provide examples of some z-flow honeycomb designs useful for this purpose.

The catalysts and catalyst/washcoat combinations applied to these honeycombs will be selected in accordance with the particular reaction to be supported, and any of the well known catalyst and washcoat formulations can be used for that purpose. Where the metal of the honeycomb support does not interfere with catalyst function, direct application of the catalyst to the support is possible. In the case of copper monoliths, processes where this can be effective include the conversion of methanol to formaldehyde using a mixed oxide catalyst comprising combinations of the oxides of Fe, Mo, V, Cu, Cr, Co and phosphorus, and the production of phthalic anhydride using a catalyst of vanadium oxide promoted with $K_2SO_4$ or a mixed metal oxide catalyst of V, Ti, Ni, K, Ce, Rb, Sb or phosphorus.

Where washcoating of the metal honeycomb with a suitable catalyst support layer is desirable, conventional washcoating formulations and processes can be used. Examples of suitable washcoat materials include alpha alumina, gamma alumina, high surface area silica, silicon carbide, zirconia, titania and the like. For the support of precious metal catalysts such as platinum, gamma alumina is generally preferred. Examples of other catalysts and reactions for which they are suitable include the production of ethylene oxide using a silver catalyst on a gamma alumina, silicon carbide or silica washcoat; the production of acrolein or acrylic acid using a mixed metal oxide catalyst of Mo, V, W, Fe, Mn, Ce, Cu, Al, Sr, Mg, or As on a silica or alumina washcoat, and the production of maleic anhydride using a mixed V—Mo oxide catalyst on alpha alumina.

A specific example of the manufacture of a copper metal monolithic honeycomb support in accordance with the invention, which is intended to be illustrative rather than limiting, is as follows.

EXAMPLE I

Copper Metal Honeycomb Extrusion

A copper metal powder is first selected for processing. The powder selected is minus-325 mesh copper metal powder having a median particle size of about 27 micrometers, commercially available from Cerac, Inc., Milwaukee, Wis. A quantity of 3.7 kilograms of this copper powder is charged into a muller and 26 grams of an oleic acid extrusion aide is slowly added. After mulling for about 5 minutes a temporary organic binder consisting of 74 grams of Methocel A4M methylcellulose powder is introduced into the mixture, followed by a slow vehicle addition of 207 grams of deionized water. The resulting mixture is further mulled for about 5 minutes prior to extrusion.

A honeycomb preform is next shaped from this mixture by extrusion of the mixture through a honeycomb extrusion die. The wet extruded honeycomb shape has a cell density of about 200 cells/in$^2$ of honeycomb cross-section and a channel wall thickness of about 0.020 inches.

To convert this extruded honeycomb to a unitary metal support it is first dried in a forced hot air oven at 70° C. for about 4 hours, and is then fired in air to remove organic residues. This firing is carried out by heating the dried honeycomb to an intermediate holding temperature of 230° C. and maintaining it at that temperature for four hours, followed by heating the honeycomb to a peak firing temperature of 350° C. and holding it there for a period of 6 hours.

Finally, the debindered honeycomb is heated in 6% $H_2$—$_{N2}$ forming gas to a holding temperature of 650° C. and is maintained at that temperature for a time of 10 hours. This heat treatment is effective to remove residual oxide phases from the wall structure of the honeycomb and to sinter the metal powder to a final wall porosity of about 30%. The median pore diameter within the honeycomb wall structure is about 3.6 micrometers. X-ray diffraction examination of the honeycomb indicates the presence of copper metal only; no oxide phases are detected.

The stability of copper against corrosion in a chemical reactor environment can be demonstrated by exposing copper samples to conditions corresponding to those encountered in a water-gas shift reactor. For that purpose a copper foam sample is placed in a reaction chamber containing an atmosphere consisting of 10% $H_2$, 5% CO, 11% $CO_2$, 25% $H_2O$ and the balance $N_2$ by volume. The sample is then processed through twelve reaction cycles in sequence, each cycle comprising heating the chamber at a rate of 8° C./min to a reactor temperature of 600° C., maintaining that temperature for 5 hours, and then: returning the chamber to room temperature. The total weight loss of the sample following this treatment is below 0.2%, and no additional metal or oxide phases are detected during an x-ray diffraction examination of the processed material. Thus copper monoliths provided in accordance with the method of the invention are expected to demonstrate excellent durability as well as improved heat management in reactors such as water gas shift reactors where good long-term resistance to corrosive reactor environments is required.

We claim:

1. A method for making a monolithic metallic catalyst substrate comprising the steps of:

compounding a metal powder extrusion batch comprising (i) a powder of a metal selected from the group consisting of copper, tin, zinc, aluminum, silver, iron, nickel, and mixtures and alloys thereof, and (ii) at least one carbon-containing temporary organic binder;

extruding the batch through a honeycomb extrusion die to form a honeycomb substrate preform;

heating the honeycomb substrate preform in an oxidizing atmosphere for a time and to a temperature at least sufficient to substantially remove the carbon-containing organic binder or extrusion aide by oxidation, thus to provide a carbon-free preform; and heating the carbon-free preform in a reducing atmosphere for a time and to a temperature at least sufficient to sinter the carbon-free preform to a unitary monolithic metallic catalyst substrate.

2. A method in accordance with claim 1 wherein the powder is copper metal powder.

3. A monolithic copper catalyst substrate produced in accordance with the method of claim 2.

4. A monolithic copper catalyst substrate in accordance with claim 3 which incorporates a high surface area washcoat and a metal or metal oxide catalyst.

5. A monolithic copper catalyst substrate in accordance with claim 4 wherein the washcoat is composed of alumina and the catalyst comprises a precious metal.

6. A monolithic catalyst substrate in accordance with claim 3 having a wall flow honeycomb configuration.

7. A monolithic copper catalyst substrate in accordance with claim 3 having a z-flow honeycomb configuration.

8. A method in accordance with claim 1 wherein the metal powder extrusion batch further includes an organic extrusion aide and a liquid vehicle.

9. A method in accordance with claim 1 wherein the carbon-free preform is heated in a reducing atmosphere at a time and for a temperature at least sufficient to achieve a honeycomb wall porosity in the range of 0–50% by volume.

* * * * *